Oct. 5, 1965

F. R. BRAVENEC 3,210,530

LOGARITHMIC CONVERTER

Filed Sept. 13, 1961

Frank R. Bravenec
INVENTOR.

BY Browning, Simms, Hyer
& Eichenroht
ATTORNEYS

Oct. 5, 1965  F. R. BRAVENEC  3,210,530
LOGARITHMIC CONVERTER
Filed Sept. 13, 1961  3 Sheets-Sheet 2
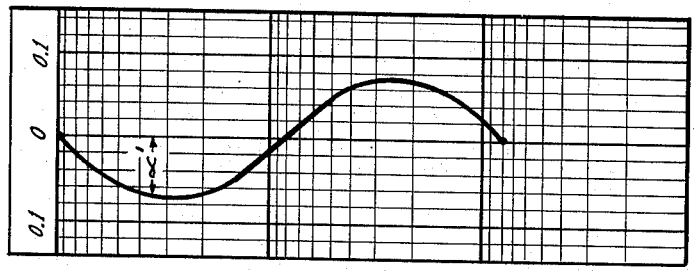
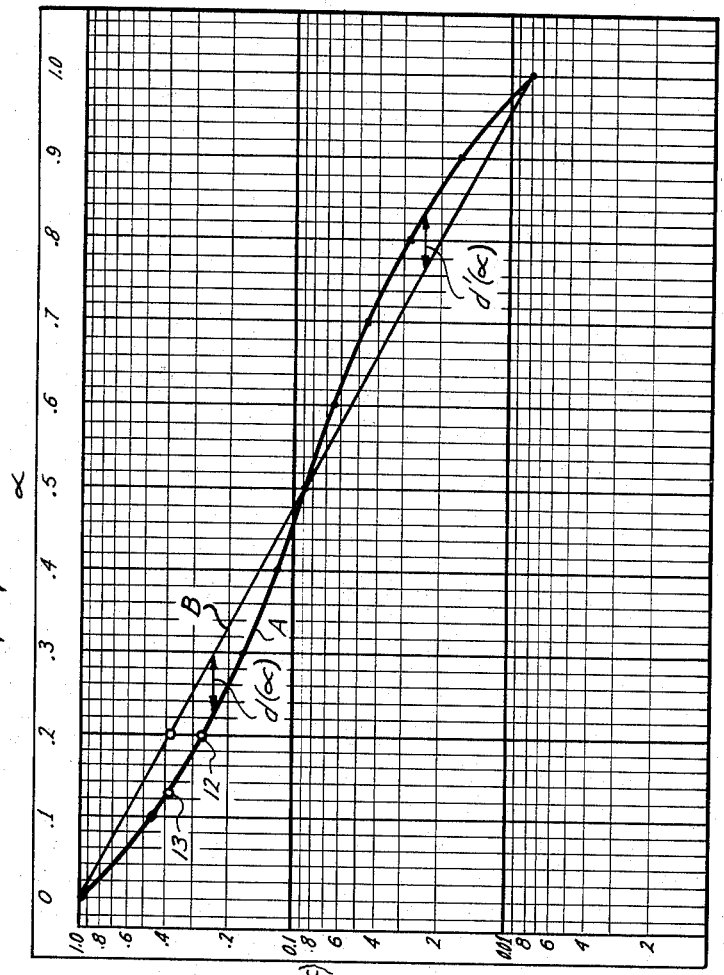
Frank R. Bravenec
INVENTOR.
BY *Browning, Simmons, Hyer & Eichenroht*
ATTORNEYS Oct. 5, 1965    F. R. BRAVENEC    3,210,530
LOGARITHMIC CONVERTER
Filed Sept. 13, 1961    3 Sheets-Sheet 3

Frank R. Bravenec
INVENTOR.

BY Browning, Simmons, Hyer
& Eichenroht

ATTORNEYS

United States Patent Office 3,210,530
Patented Oct. 5, 1965

3,210,530
LOGARITHMIC CONVERTER
Frank R. Bravenec, Houston, Tex., assignor to Houston Instrument Corporation, Houston, Tex.
Filed Sept. 13, 1961, Ser. No. 137,913
13 Claims. (Cl. 235—197)

This invention relates to a logarithmic converter for obtaining linear or angular motion or an electrical signal proportional to the logarithm of the ratio of an input voltage to an output voltage or to a reference voltage. In another of its aspects, it relates to a converter in which the anti-logarithm of a linear or angular displacement input is proportional to the ratio of the input to the output voltage.

The logarithm of voltage ratios, normally expressed in decibels (or twenty times the logarithm to the base ten of the ratios), are commonly used in computation since complex functions can be readily multiplied or divided by simple addition or subtraction of the logarithms. Quantities are frequently converted to logarithms in computing devices for the same purpose. Moreover, a wide range of amplitude may be displayed graphically with equal percentage readability at any point on the graph. Instrument dials and voltmeter scales are often made approximately logarithmically divided for the same reason. Nearly all data pertaining to acoustics or the frequency response of loud speakers, microphones, filters, amplifiers, etc., are presented in terms of decibels versus log frequency, that is, with both scales logarithmic.

In the past, numerous devices have been suggested for automatically indicating or plotting the voltage ratio in decibels. Vacuum tube voltmeters employing moving coil panel type microammeters have been provided with specially shaped air gaps to facilitate use of decibel scale divisions. These voltmeters require frequent scale switching since they cover only one decade.

Other devices of this general category are not only of limited range, but are lacking in desired accuracy. It has been suggested, for example, that non-linear logarithmic potentiometers be used for the conversion. These potentiometers, if single turn and card wound, involve the use of varying wire sizes and spacing and have poor accuracy. Multiturn non-linear potentiometers require varying wire sizes, taps and padding resistors to accommodate a large range of input voltages. These are normally wound on a helical metallic mandrel and are very limited in high frequency response. Moreover, high accuracy, even at low frequencies, is very costly to obtain if the non-linear potentiometer is to work over a large range of amplitude. For example, the rate of change of resistance with angular or linear motion must vary 1000:1 on the same winding to cover a range of 60 decibels. An error tolerance of 1% of full scale is equivalent to an error of 1000% at the other end. A reasonable fixed percentage error of the input at any level is difficult to obtain with presently known techniques for manufacturing non-linear or logarithmic potentiometers.

Both the semiconductor and vacuum tube diodes under certain conditions of operation will produce an output signal proportional to the logarithm of the input signal. Such devices are in commercial use in computers and in logarithmic converters used in conjunction with X–Y and strip chart recorders. These devices are, however, limited in amplitude range, are subject to variations with temperature, are difficult to adjust and do not have precisely defined endpoints in their range of operation. Associated circuits required for their use are usually complex and difficult to stabilize. Their uses as logarithmic converters have therefore been very limited.

It is therefore a general object of this invention to provide a logarithmic converter which is relatively simple to construct in that it utilizes, in simplest form, only linear potentiometers. Such type of potentiometer is, of course, of relatively low cost, of excellent accuracy and of stable operation.

Another object is to provide such a converter using linear potentiometers and which can have a wide range of conversion with excellent accuracy throughout its entire range. Thus, converters having from 40 to 60 decibel ranges are entirely feasible with a very high degree of accuracy and wider range converters are possible with somewhat less accuracy.

Another object is to provide such a converter which is of very simple design and which utilizes relatively few components which are readily available as stock items of high degree of accuracy.

Another object is to provide such a converter in which only standard linear potentiometers need be used, thereby eliminating the need for special and expensive non-linear potentiometers while at the same time achieving greater accuracy than has been possible in the past with non-linear potentiometers.

Another object is to provide a logarithmic converter having an output which is precisely proportional to the logarithm of an input voltage relative to a known or unknown reference voltage, which output can be in the form of a mechanical motion or positioning or an electrical signal.

Other objects, advantages and features of the invention will be apparent to one skilled in the art upon consideration of the specification, the claims and the attached drawings wherein:

FIG. 2 is a plot of actual results obtained using the circuit of FIG. 1 when the elements thereof have the values disclosed below and shows the actual transfer function of the circuit of FIG. 1 before correction, versus the angular position of the potentiometer shafts and also shows the degree of correction required for various shaft positions;

FIG. 3 is a plot of the correction required for various shaft positions in order to cause the log of the transfer function to vary linearly with the position of a control shaft;

Like characters of reference will be used throughout the several views to designate like parts.

Figure 1:
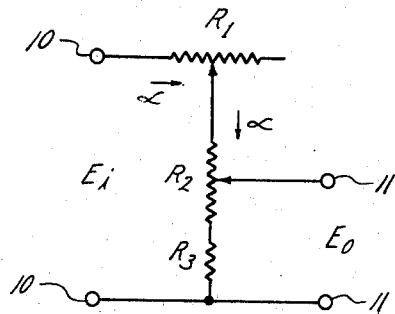
FIG. 1 is a schematic illustrating one form of the logarithmic converter of this invention.

Referring now to FIG. 1, there is illustrated a four-terminal network having input terminals 10 and output terminals 11. A pair of potentiometers $R_1$ and $R_2$ are connected in the network in such a manner that $R_1$ controls the voltage applied to $R_2$. $R_2$ in turn controls the portion of the voltage applied thereto which is imposed across the output terminals 11. Both the potentiometers $R_1$ and $R_2$ are preferably linear in construction whereby the cost of the converter is maintained at a minimum.

The wipers or sliding contacts of the potentiometers are movable in unison, as by a servomechanism described below or other suitable means. In the preferred construction, the potentiometers are ganged in that the control shaft of one is mechanically connected to the control shaft of the other in such a manner that both wipers move in the same direction and the same physical distance across their respective resistive windings. Thus, as the wiper of $R_1$ moves in a direction to decrease the voltage applied to $R_2$ (i.e., the wiper of $R_1$ moves to increase the amount of effective resistance $R_1$ contributes to the circuit) the wiper of $R_2$ moves in a direction to decrease the voltage applied to the output terminals. For the purpose of this discussion, the amount of wiper movement will be represented by alpha which will designate a wiper position as a fraction of the total permissible wiper travel from one end of the rheostat. For example, when alpha is 0.5, this means that the wiper has moved half way through its total travel. For the sake of convenience, both wipers will usually have the same physical travel range but obviously, a suitable linkage could be provided whereby one wiper would have a different range in inches of travel from the other wiper. To allow for this, alpha was chosen as a fraction of the total wiper travel rather than to designate alpha in terms of inches or degrees of rotation.

It has been found that when two properly sized potentiometers are connected as described above, the transfer function of the network ($E_o/E_i$) when plotted logarithmically will vary with shaft position of the potentiometers in a manner similar to curve A in FIG. 2. The exact shape of the curve will be dependent upon the factors discussed below and can be varied considerably from the shape shown in FIG. 2. In order to change the shape of curve A so that the log of the transfer function varies linearly, that is, conforms to the straight line B, a correction factor can be applied to the potentiometer shafts. For example, referring to FIG. 2, with the potentiometer shafts turned through two-tenths of their total travel (alpha equals 0.2) the transfer function, in order to be a linear function, should be slightly less than 0.4 whereas the actual uncorrected transfer function is about 0.27 as is designated by the numeral 12. In order to cause the transfer function to be the correct value, the potentiometer shafts can be moved to approximately 0.125 alpha as designated by the point 13 at which position the transfer function will be the true value of slightly less than 0.4.

Therefore, in accordance with this invention, a control element, such as the output shaft of a servomechanism, is linked to the potentiometer shafts by a mechanism which is non-linear and which causes the wipers to be positioned such that with linear variation of the control shaft, the resistive elements or potentiometers will vary their respective voltage outputs such that the logarithm of the transfer function of the network varies linearly with the position of the control shaft or element. For example, if we now assume that the X axis of FIG. 2 represents the position of the control shaft of the servomechanism, positioning of this shaft at an alpha of 0.4 will cause the wipers to move so that the potentiometer shafts are at an alpha of about 0.36 whereby the transfer function of the network is 0.145 which corresponds to the value it should have at the intersection of 0.4 alpha with the straight line B. Thus, for the curve of FIG. 2, the actual potentiometer shaft position lags behind the corresponding alpha position of the servomechanism shaft by a distance $d$ (alpha) through the alpha range of 0 to 0.5, whereas through the alpha range of 0.5 to 1.0, the potentiometer shaft position leads the servomechanism shaft position by a distance corresponding to $d'$ (alpha).

Figure 4:
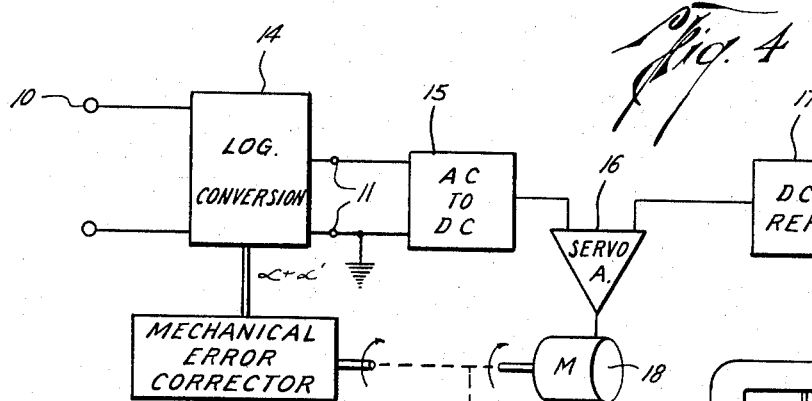
FIG. 4 is a block diagram illustrating the logarithmic converter of FIG. 1 in combination with other elements and shows how the output can be recorded on an X–Y recorder or provided in the form of an electrical signal.

It has been found that by properly sizing the two potentiometers relative to each other and by selection of a suitable resistance $R_3$, as discussed below, the degree of correction of potentiometer shaft or wiper position is a sinusoidal function throughout the range of travel of the shaft or wiper. This is illustrated in FIG. 3 wherein the transfer function is plotted against the amount of correction to be applied to the wipers at various positions thereof. It will be noted that the curve of FIG. 3 is a sine curve and while the converter of this invention can be designed so that its uncorrected output curve A can have a variety of shapes resulting in the correction factor curve being other than sine in nature, it is greatly preferred to design the circuit so that the correction factor curve does vary sinusoidally because of the simplicity with which this correction can be made. Thus, it is only necessary to connect the control shaft (servomechanism output shaft) to the potentiometer shafts by a mechanism which converts the linear motion of the servomechanism shaft to a linear motion superimposed by a sinusoidal motion for the potentiometer shaft. Referring now to FIG. 4, one such arrangement will be described in connection with a servomechanism control. Thus, in FIG. 4, the circuit of FIG. 1 is shown in the block labeled 14. The output of this circuit, should the input voltage be other than a direct current, is rectified by a suitable rectifier 15 and the resulting D.C. voltage is supplied to servoamplifier 16 where it is compared with a reference voltage from the reference source 17. The resulting error voltage is used to control a servomotor 18 whose output shaft may be connected to a mechanical error corrector which superimposes a sinusoidal motion on the linear motion of the servomechanism output shaft.

Figure 7:
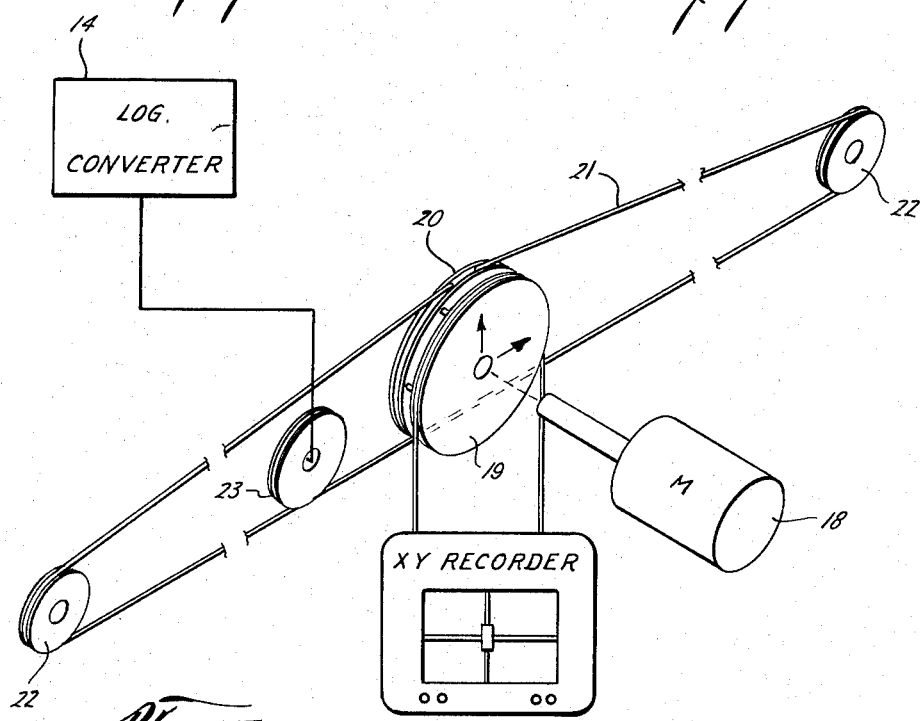
FIG. 7 illustrates one form of a mechanical error corrector which can be used in the embodiment of FIG. 4 as well as other embodiments.

Thus, as shown in FIG. 7, the output shaft of servomotor 18 is connected to a pulley 19. Another pulley 20 is fastened to pulley 19 with its center eccentric to that of pulley 19. A dial cord 21 is then wrapped at least once around the eccentric pulley 20 and threaded to idler pulleys 22 and then passed to and completely around driven pulley 23 which is connected to the shaft of the potentiometers. Then as pulley 19 is rotated, the eccentric pulley 20 will cause the cord 21 to drive pulley 23 and hence the potentiometers, with a sinusoidal movement superimposed upon a linear movement with respect to the rotation of the servomechanism motor shaft. By properly sizing the various pulleys and by choosing the proper degree of eccentricity of pulley 20, the proper correction factor corresponding to the curve of FIG. 3 will be applied to the potentiometer shaft. In this connection, it will be noted that pulley 20 will tend to impart two sinusoidal motions as indicated by the arrows on pulley 19. Since only the motion indicated by the horizontal arrow is desired, the motion indicated by the vertical arrow can be substantially canceled out, or at least decreased to a value which is of no significance, by locating pulleys 22 a sufficient distance from pulley 20. Of course, the greater the distance, the smaller will be the effect of motion indicated by the vertical arrow.

While a particular non-linear mechanical corrector has been described, it will be appreciated that other types can be used. Also, where the logarithmic converter circuit is designed so that the correction does not vary sinusoidally, but in another manner, the shape of pulley 20 can be varied accordingly so that the proper correction factor is applied to the potentiometer. In such case, it may be advisable to employ specially shaped cams in place of the pulley arrangement and the design of cams to obtain various sorts of output motions is well known to those skilled in the art.

As indicated in FIG. 4, the servomechanism will act to maintain the output voltage constant at terminals 11. With this voltage constant, the position of the shaft of the servomechanism will vary, in effect, linearly with the logarithm of the input voltage. Accordingly, the logarithm of the input voltage can be recorded on an X–Y recorder simply by connecting the recorder pen to be positioned by the servomechanism shaft. When an electrical signal is desired with an amplitude varying linearly with the logarithm of the input voltage, the servomechanism shaft can be connected to position a wiper 25 of a potentiometer 26 connected across a suitable voltage source 27. Accordingly, the voltage at the terminals 28 will be a linear function of the logarithm of the input voltage $E_i$.

To illustrate the method of sizing the components of the FIG. 1 circuit so that the curves of FIGS. 2 and 3 can be realized, let it be assumed that the logarithmic converter is to have a 42 decibel range of transfer function. If we let the total resistance of potentiometer $R_1$ be denoted by R, the total resistance of potentiometer $R_2$ by AR and the resistance $R_3$ by BR, A and B being constants, then $$\frac{E_o}{E_i}=\frac{AR+BR-\text{alpha } AR}{AR+BR+\text{alpha } AR} \quad (1)$$

$$=\frac{A+B-\text{alpha } A}{A+B+\text{alpha}} \quad (2)$$

Also, when the transfer function is to vary exactly logarithmically, it must conform to the following equation:

$$\frac{E_o}{E_i}=10^{-Q\text{ alpha}} \text{ where } Q=\frac{\text{decibels of range}}{20} \quad (3)$$

Now in order for the correction curve of FIG. 3 to be sinusoidal, the uncorrected output curve A of FIG. 2 must intersect the straight line B at its endpoints and also at its center. Therefore, in the Equation 3, we can substitute 0, 0.5 and 1.0 for alpha to give three values of the transfer function on the straight line and at its endpoints and midpoint. Thus, $$\text{alpha}=0 \frac{E_o}{E_i}=1$$

$$\text{alpha}=0.5 \frac{E_o}{E_i}=0.089125$$

$$\text{alpha}=1 \frac{E_o}{E_i}=0.0079434$$

We can also substitute the 0.5 and 1.0 alpha values in Equation 2 and set these respectively equal to the above values as follows:

$$f(\text{alpha})=\frac{E_o}{E_i}=\frac{A+B-0.5A}{A+B+0.5}=0.089125$$

$$=\frac{A+B-A}{A+B+1}=0.0079434$$

Simultaneous solution of these equations gives the value for A of 0.089126 and B of 0.0087207. Therefore, once the value of potentiometer $R_1$ has been chosen (e.g. 5000 ohms), the value of the other potentiometer and resistance $R_3$ can be calculated. Similarly, by substituting these values for A and B in Equation 2, the equation of curve A of FIG. 2 can be written as follows:

$$f(\text{alpha})=\frac{E_o}{E_i}=\frac{1+0.91087\text{ alpha}}{1+10.220\text{ alpha}}$$

whereas as indicated above, the equation of curve B is $$\frac{E_o}{E_i}=10^{-2.1\text{ alpha}}$$

for a 42 decibel range.

In a similar manner, the relative values of components can be calculated for other ranges and it has been found that this circuit has a reasonably wide range conversion such that up to a 60 decibel range is practical and an even broader range can be achieved with less accuracy. As for the accuracy of this circuit, a complete logarithmic converter similar to FIG. 4 has been built with a range of 42 decibels and has an accuracy of plus or minus 0.4 decibel throughout the range. In fact, the accuracy of the circuit of this invention (with correction) approaches the linearity accuracy of the potentiometers; e.g. ±0.1% accuracy in linearity of the potentiometers can produce an overall accuracy of the circuits of ±0.1% full scale decibel.

In view of the foregoing, it is seen that the ratio of $R_3$ to $R_1+R_2$ determines the lower end of the range of the circuit and the relative values of $R_1$ and $R_2$ determine the shape of the curve A, i.e., the point at which it intersects the straight line B.

Figure 5:
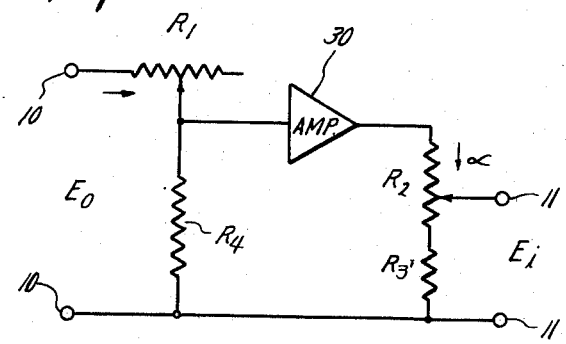
FIG. 5 shows another embodiment of the converter in which the size of the two potentiometers can be varied relative one to the other.

In some cases, it may not be possible to purchase as a stock item a potentiometer corresponding to the calculated value of $R_2$. In such event, instead of having to build a special potentiometer, the circuit of FIG. 5 can be used. This circuit is similar to that of FIG. 1 except that an isolation amplifier 30 is connected between potentiometers $R_1$ and $R_2$ and a terminal resistance $R_4$ is added. The amplifier preferably has a gain of 1 and with this arrangement, the value of $R_2$ relative to $R_1$ is not important and it can, for example, have the same value as $R_1$ and yet a sine type of correction curve can be achieved.

Figure 6:
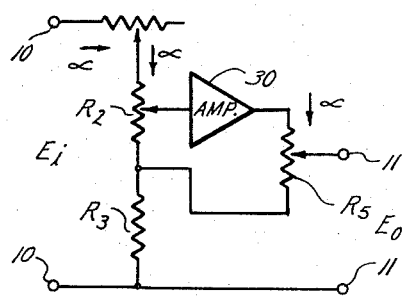
FIG. 6 shows still another embodiment illustrating a converter susceptible of having a greater range than the one shown in FIG. 1 without increasing the magnitude of the correction factors.

In FIG. 6 is shown still another circuit arrangement which can be used to obtain broader ranges without a corresponding increase in the amount of correction factor which must be applied. Thus, with the circuit of FIG. 1, as the range increases, the departure of curve A from curve B also increases so that the correction factor has a corresponding increase. By connecting a potentiometer $R_5$ and an isolation amplifier 30 between the wiper of $R_2$ and the low side thereof, and connecting the wiper of $R_5$ to the output terminal 11, it has been found that the permissible range of the circuit can be increased without any substantial increase in the correction factor. Conversely, for the same range, the amount of correction factor can be decreased in this circuit.

Figure 8:
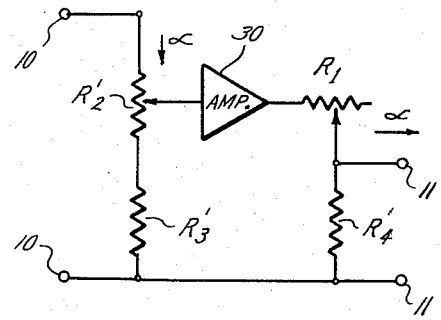
FIG. 8 shows still another embodiment illustrating a converter having a constant input impedance.

In some cases, it may be desirable to have a converter having a constant input impedance and such a circuit is shown in FIG. 8. Here the potentiometer $R_2'$ and resistance $R_3'$ are connected in series across the input terminals 10 and act as a voltage divider to yield the signal input to isolation amplifier 30. The output is taken from the wiper on $R_1$ to "ground" across $R_4$ which should have a value equal to $R_2$ plus $R_3$ in FIG. 1. Here again, the isolation amplifier permits $R_2'$ to have a value differing from that calculated for it similar to the circuit of FIG. 5. The operation of the circuit is otherwise on the same principle as that of FIG. 1.

Instead of using the mechanical corrector of FIG. 7, the servomotor 18 may be connected directly to the potentiometer shafts, that is, without any intervening mechanical corrector, and the mechanical corrector can be interposed between the servoshaft and the X-Y recorder, whereby the pen has a correction movement throughout its range, which movement is of proper amplitude and sign to correct for the departure of the transfer function from linearity. It is also contemplated that $R_3$ can be combined with $R_2$ in that a portion of the winding of $R_2$ will serve as the fixed resistance. Also, a mechanical stop can be added to the servomechanism to define the lower limit of its movement and in such case, $R_3$ can be omitted altogether. Moreover, in some cases where a high degree of accuracy and a broad range are not required, the mechanical corrector can be omitted and one or both potentiometers can be made slightly nonlinear to give the required correction so that the log of the transfer function is of the required degree of linearity with respect to shaft position of the servomechanism.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A logarithmic converter comprising a network having input and output terminals and also having resistive impedance components at least two of which are variable linear resistive elements connected so that a first element varies the voltage applied to a second element and the latter in turn varies the portion of the voltage applied thereto which is to be impressed across the output terminals, a control element, and a non-linear means interconnecting the control element with said linear resistive elements such that linear variation of the control element causes the resistive elements to vary their respective voltage outputs such that the logarithm of the transfer function of the network varies linearly.

2. A logarithmic converter comprising a network having input and output terminals and also having first and second linear potentiometers connected so that the first potentiometer varies the voltage applied to the second potentiometer and the latter varies the portion of the voltage applied thereto which is impressed across the output terminals, the potentiometers being sized relative to each other such that upon movement of their wipers in fixed relationship to each other along the respective resistive lengths of the potentiometers, there is a non-linear relation between the wiper positions and the logarithm of the transfer function of the network, a control element, and non-linear interconnecting means between the control element and the wipers such that the wipers are positioned to cause said logarithm of the transfer function to vary linearly with said control element.

3. The converter of claim 2 wherein said wipers are ganged to be moved equal distances and wherein said potentiometers are sized so that the departure of the logarithm of the transfer function of the network from linearity with movement of the wipers is a sinusoidal function, and wherein said interconnecting means causes said wipers to have a linear and superimposed sinusoidal movement respective to linear movement of the control element.

4. A log converter comprising a network having input and output terminals, a pair of linear potentiometers connected in the network so that the first potentiometer controls the amount of input voltage applied to the second potentiometer and the latter controls the portion of voltage applied thereto which is to be applied across the output terminals, the wipers of the potentiometers being ganged together so that they simultaneously move over predetermined resistive ranges of their respective potentiometers with such ranges being sized relative to each other such that the logarithm of the transfer function of the network is approximately linear with the movement of the wipers, a control element, and non-linear means interconnecting the control element and wipers so that the logarithm of the transfer function of the network varies linearly with the position of said control element.

5. The converter of claim 4 wherein said potentiometers are separated by an isolation amplifier.

6. The converter of claim 4 in combination with a third potentiometer connected across the second potentiometer through an isolation amplifier and having its wiper connected to an output terminal, the wiper of the third potentiometer being ganged to those of the first and second potentiometers.

7. A logarithmic converter apparatus comprising a network having input and output terminals and a pair of linear potentiometers connected so that the first potentiometer varies the voltage applied to the second potentiometer and the latter varies the portion of the input voltage applied thereto which is applied to the output terminals, the wipers of the potentiometers being ganged together for movement in unison over the respective resistive ranges of the potentiometers, said ranges being chosen relative to each other such that the logarithm of the transfer function of the network is a direct function of wiper position at at least three wiper positions within said ranges, and a servomechanism means sensing the output voltage and moving said wipers to maintain said output voltage constant and including an output element whose positioning is to be linear with the logarithm of the transfer function of the network, and a non-linear connection between the output element and the wipers causing the position of the latter to vary in a predetermined non-linear fashion between said three points so that the logarithm of the transfer function is linear with the position of said output element throughout said resistive ranges.

8. The apparatus of claim 7 wherein said resistive ranges are chosen so that two of said three positions are at the ends of the range of the converter and the other wiper position is one-half way between the end positions and wherein said non-linear connection contains a sine generator whereby said wipers have a linear and superimposed sinusoidal movement with linear movement of the output element.

9. The apparatus of claim 7 wherein a fixed resistance is effectively in series with said second potentiometer to determine the minimum value of the logarithm of the transfer function of the network.

10. The apparatus of claim 9 in combination with a third potentiometer connected between the wiper of the second potentiometer and a point between the fixed resistance and the second potentiometer, the wiper of the third potentiometer being connected to one output terminal.

11. The apparatus of claim 7 wherein the pair of linear potentiometers are electrically separated by means of an isolation amplifier.

12. A logarithmic converter comprising a network having input and output terminals and also having a first resistive impedance connected across the input terminals at least a portion of which impedance is a first linear potentiometer, an isolation amplifier having its input connected to the wiper of the first potentiometer, a second resistive impedance connected across the output of the amplifier with at least a portion of said second impedance being a second linear potentiometer having its wiper connected to the output of said network, a control element, and non-linear means interconnecting the control element and wipers so that the logarithm of the transfer function of the network varies linearly to the position of said control element.

13. A logarithmic converter comprising a network having input and output terminals; an amplifier; a first resistive impedance, including a first linear potentiometer, connected across the input terminals to provide a constant impedance load thereacross and to the amplifier to provide a variable voltage input thereto; a second resistive impedance, including a second linear potentiometer, connected to the output of the amplifier and to the output terminals to vary the voltage applied across said output terminals, a control element, and a non-linear means interconnecting the control element with said potentiometers such that linear variations of the control element causes the resistive elements to vary their respective voltage outputs such that the logarithm of the transfer function of the network varies linearly.

References Cited by the Examiner

UNITED STATES PATENTS

| | | | |
|---|---|---|---|
| 2,947,934 | 8/60 | Bolie | 235—197 X |
| 2,975,370 | 3/61 | Moseley et al. | 235—197 X |
| 3,024,408 | 3/62 | Krack | 333—81 X |

MALCOLM A. MORRISON, *Primary Examiner.*

DARYL W. COOK, *Examiner.*